3,126,416
PURIFICATION OF ARYL SECONDARY
PHOSPHINE OXIDES
James Leonard Willans, Abingdon, England, assignor to United Kingdom Atomic Energy Authority, London, England
No Drawing. Filed Feb. 5, 1962, Ser. No. 171,306
Claims priority, application Great Britain Feb. 9, 1961
2 Claims. (Cl. 260—606.5)

This invention relates to methods of purification of aryl secondary phosphine oxides. These phosphine oxides are of generic formula:

where R and R' may be any aromatic radical, e.g. a phenyl-, tolyl-, ethylphenyl-, propylphenyl-, butylphenyl-, amylphenyl-, hexylphenyl- or methoxyphenyl-radical, and R may be different from R'.

Aryl secondary phosphine oxides have been prepared by a number of routes:

(1) The action of arylmagnesium bromides on dialkyl hydrogen phosphonates (dialkyl phosphites) e.g.:

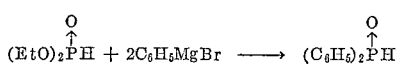

(2) The action of aryllithium compounds on dialkyl hydrogen phosphonates (dialkyl phosphites), e.g.:

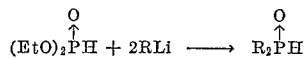

where R=phenyl-, o-methoxyphenyl-, or p-methoxyphenyl radical.

(3) The hydrolysis of the Friedel-Crafts reaction mixture from highly methylated benzenes, phosphorus trichloride and aluminum trichloride:

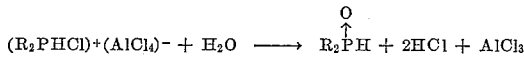

where R=mesityl-, duryl-, or pentamethylphenyl-radical, or as described in co-pending U.K. application No. 4,892/61, U.S. patent application No. 171,308, filed February 5, 1962.

(4) The hydrolysis of diarylchlorophosphines, e.g.:

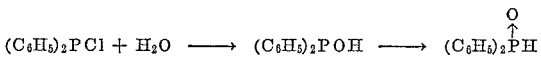

Aryl secondary phosphine oxides are unstable and readily disproportionate, even under the mildest conditions, into equal parts of phosphine and diaryl phosphinic acid:

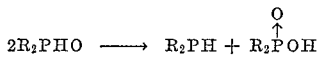

When atmospheric oxygen is not excluded the main product is the phosphinic acid. Furthermore, it has been reported that pure di-n-octylphosphine oxide in the absence of a base could be heated in a sealed tube under nitrogen for several hours at 200–250° with negligible loss of starting material, but the same compound readily disproportionated when heated at 245° under the same conditions with sodium hydroxide.

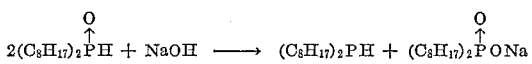

An object of this invention is to provide a simple and inexpensive method of purifying the reactive aryl secondary phosphine oxides which will obviate decomposition by oxidation and/or by disproportionation.

According to the invention a method of purification of a crude diarylphosphine oxide comprises the steps of reacting the said phosphine oxide with a lower alkyl ketone, isolating the diaryl (hydroxyisoalkyl) phosphine oxide so formed and heating the said diaryl (hydroxyisoalkyl) phosphine oxide in the absence of oxygen or moisture to regenerate the pure diarylphosphine oxide. The reaction takes place as follows:

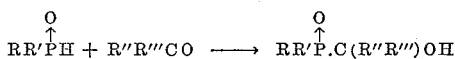

where R and R' are aromatic radicals, and R" and R'" are lower alkyl radicals, i.e. methyl-, ethyl-, or propyl-radicals.

The ketone addition complexes are solids and can be easily handled, purified and dried without decomposition at ambient temperatures.

The process of this invention utilizes the discovery that the diaryl (2-hydroxyalkyl) phosphine oxides decompose quantitatively, with the exclusion of oxygen and moisture, at temperatures at or above their melting point into the original secondary phosphine oxide and ketone. This makes it possible to regenerate pure diarylphosphine oxide from the purified ketone addition complex, and provides a means of purification of the phosphine oxide in a simple and inexpensive way.

Suitable ketones include acetone, diethyl ketone, methyl ethyl ketone and methyl propyl ketone.

The following example is a preferred way of carrying the invention into effect, the parts being by weight.

*Example*

One part of diphenylphosphine oxide

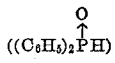

is dissolved in 2.5 parts acetone and warmed on a steam bath for a few minutes until the diphenyl (2-hydroxyisopropyl) phosphine oxide begins to crystallise. The solution is set aside for two hours, and the crystalline precipitate isolated at the pump. The product is washed at the pump with one part of acetone and dried at 60° C. to yield a pure white compound (83% theory) which melts at 137–139° C. with decomposition. The product can if necessary be further purified by recrystallisation from an acetone-methylated spirit mixture. The pure diphenylphosphine oxide is obtained quantitatively from diphenyl (2-hydroxyisopropyl) phosphine oxide by heating it under vacuum in an oil bath maintained at 140–150° C. until all the acetone has evolved. The product is allowed to cool down to room temperature under vacuum, and stored under an atmosphere of dry nitrogen.

The diarylphosphine oxides are useful as intermediates in the production of tertiary phosphine oxides, e.g. as described in copending U.K. application No. 4,890/61, U.S. patent application No. 171,307, filed February 5, 1962.

I claim:
1. A method of purification of a crude diarylphosphine oxide which comprises the steps of reacting the said phosphine oxide with a lower alkyl ketone, isolating the diaryl (hydroxyisoalkyl) phosphine oxide so formed and heating the said diaryl (hydroxyisoalkyl) phosphine oxide in the absence of oxygen and moisture to regenerate the pure diarylphosphine oxide.

2. A method according to claim 1, in which the lower alkyl ketone is selected from the group consisting of acetone, diethyl ketone, methyl ethyl ketone and methyl propyl ketone.

No references cited.